US008581969B2

(12) United States Patent
Mount

(10) Patent No.: US 8,581,969 B2
(45) Date of Patent: Nov. 12, 2013

(54) SINGLE DISPLAY SYSTEM AND METHOD FOR DISPLAYING STEREOSCOPIC CONTENT

(75) Inventor: George Mount, Palo Alto, CA (US)

(73) Assignee: NVIDIA Corporation, Santa Clara, CA (US)

(*) Notice: Subject to any disclaimer, the term of this patent is extended or adjusted under 35 U.S.C. 154(b) by 659 days.

(21) Appl. No.: 12/333,214

(22) Filed: Dec. 11, 2008

(65) Prior Publication Data

US 2010/0149318 A1 Jun. 17, 2010

(51) Int. Cl.
*H04N 13/04* (2006.01)

(52) U.S. Cl.
USPC .................................. 348/57; 348/42; 348/58

(58) Field of Classification Search
USPC .................................. 348/42, 57, 58
See application file for complete search history.

(56) References Cited

U.S. PATENT DOCUMENTS

| | | | |
|---|---|---|---|
| 4,792,850 A | 12/1988 | Liptoh et al. | |
| 4,879,603 A * | 11/1989 | Berman | 348/832 |
| 5,002,387 A * | 3/1991 | Baljet et al. | 352/63 |
| 5,083,851 A * | 1/1992 | MacDonald | 359/462 |
| 5,245,319 A * | 9/1993 | Kilian | 345/9 |
| 5,694,164 A * | 12/1997 | Choi | 348/57 |
| 5,726,703 A * | 3/1998 | Izawa et al. | 348/46 |
| 5,821,989 A * | 10/1998 | Lazzaro et al. | 348/56 |
| 5,975,704 A * | 11/1999 | Basey | 353/20 |
| 5,982,538 A * | 11/1999 | Shikama et al. | 359/465 |
| 6,188,442 B1 * | 2/2001 | Narayanaswami | 348/564 |
| 6,252,570 B1 * | 6/2001 | Mangerson | 345/87 |
| 6,412,949 B1 * | 7/2002 | Halldorsson | 353/8 |
| 6,456,432 B1 * | 9/2002 | Lazzaro et al. | 359/464 |
| 6,943,955 B2 * | 9/2005 | Kaschke et al. | 359/630 |
| 7,072,110 B2 * | 7/2006 | Palovuori | 359/464 |
| 7,114,809 B2 * | 10/2006 | Palovuori | 353/7 |
| 7,484,340 B2 * | 2/2009 | Ishihara et al. | 353/20 |
| 7,929,066 B2 * | 4/2011 | Ezhov | 349/15 |
| 2002/0080496 A1 | 6/2002 | Kaschke et al. | |
| 2004/0263968 A1 * | 12/2004 | Kobayashi et al. | 359/462 |
| 2005/0041163 A1 * | 2/2005 | Butler-Smith et al. | 348/744 |
| 2006/0285026 A1 | 12/2006 | Robinson | |
| 2006/0291053 A1 | 12/2006 | Robinson et al. | |
| 2007/0139624 A1 * | 6/2007 | DeCusatis et al. | 353/84 |
| 2008/0055546 A1 * | 3/2008 | DeCusatis et al. | 353/7 |
| 2008/0303962 A1 | 12/2008 | Tomita et al. | |
| 2009/0051759 A1 * | 2/2009 | Adkins et al. | 348/53 |
| 2009/0142041 A1 * | 6/2009 | Nagasawa et al. | 386/124 |
| 2009/0147075 A1 * | 6/2009 | Plant | 348/54 |
| 2010/0013911 A1 * | 1/2010 | Jacobs et al. | 348/54 |
| 2010/0149318 A1 * | 6/2010 | Mount | 348/51 |

FOREIGN PATENT DOCUMENTS

| | | |
|---|---|---|
| CN | 200810098681 | 12/2008 |
| JP | 62223719 A | 10/1987 |
| JP | 9138371 A | 5/1997 |
| JP | 2000004454 A | 1/2000 |

(Continued)

OTHER PUBLICATIONS

Examination Report from German Application No. 102009045765.8 dated Feb. 16, 2011.

(Continued)

*Primary Examiner* — Phuoc Nguyen
(74) *Attorney, Agent, or Firm* — Zilka-Kotab, PC

(57) ABSTRACT

A single display system and method are provided for displaying stereoscopic content. In particular, a single display mechanism capable of displaying stereoscopic content for viewing with passive glasses is provided.

16 Claims, 4 Drawing Sheets

(56) References Cited

FOREIGN PATENT DOCUMENTS

| JP | 2000284223 A | 10/2000 |
|---|---|---|
| KR | 1020060078465 A | 5/2006 |
| WO | 9618268 | 6/1996 |
| WO | 2005020590 A1 | 3/2005 |
| WO | 2005069269 A1 | 7/2005 |
| WO | 2007024313 A1 | 3/2007 |
| WO | 2008056929 A1 | 5/2008 |

OTHER PUBLICATIONS

Notice of Preliminary Rejection from Korean Application No. 10-2009-122970 dated Feb. 25, 2011.
Combined Search and Examination Report from GB Application No. GB0917904.5, dated Dec. 17, 2009.
Notice of Final Rejection from Korean Patent Application No. 10-2009-0122970, dated Nov. 11, 2011.
Final Rejection from Japanese Patent Application No. 2009-242561, dated May 15, 2012.
Office Action from Chinese Patent Application No. 200910249687.1, dated Apr. 27, 2012.
Office Action from Chinese Patent Application No. 200910249687.1, dated Oct. 30, 2012.
Summons to Attend Oral Hearing from German Patent Application No. 10 2009 045 765.8, dated Aug. 8, 2013.

* cited by examiner

SINGLE DISPLAY SYSTEM AND METHOD FOR DISPLAYING STEREOSCOPIC CONTENT

FIELD OF THE INVENTION

The present invention relates to stereoscopic content, and more particularly to mechanisms for displaying stereoscopic content.

BACKGROUND

Traditionally, stereoscopic content has provided an illusion of depth to an image. In this way, the display of stereoscopic content has allowed viewers to view images in three-dimension (3-D). However, techniques for displaying stereoscopic content have exhibited various limitations.

For example, displaying stereoscopic content utilizing a projector has customarily required two separate projectors each aiming an image at a single screen. A viewer wearing passive glasses is able to see images displayed by the two projectors stereoscopically. In general, the image provided by a first one of the projectors is targeted at one eye of a viewer, whereas the image provided by a second one of the projectors is targeted at the other eye of the viewer.

There is thus a need for addressing these and/or other issues associated with the prior art.

SUMMARY

A single display system and method are provided for displaying stereoscopic content. In particular, a single display mechanism capable of displaying stereoscopic content for viewing with passive glasses is provided.

DETAILED DESCRIPTION

Figure 1:
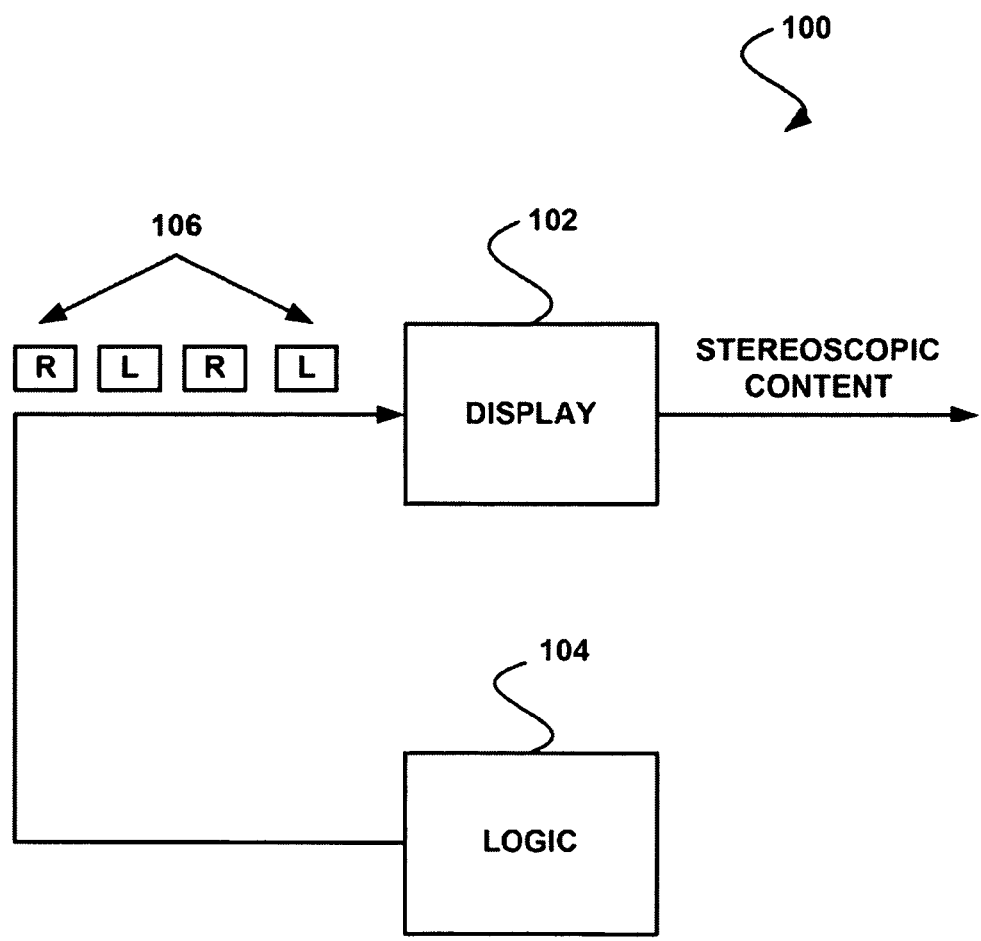
FIG. 1 shows a single display system for displaying stereoscopic content, in accordance with one embodiment.

FIG. 1 shows a single display system 100 for displaying stereoscopic content, in accordance with one embodiment. As shown, a single display mechanism 102 is provided which is capable of displaying stereoscopic content for viewing with passive glasses. With respect to the present embodiment, the single display mechanism 102 may include a liquid crystal display (LCD).

For example, the single display mechanism 102 may be integrated with a polarized filter. In addition, the single display mechanism 102 may be integrated with a liquid crystal. Such polarized filter and liquid crystal will be described in more detail below. It should be noted that while an LCD is described herein, the single display mechanism 102 may include any type of display that is capable of displaying stereoscopic content for viewing with passive glasses.

Further, the stereoscopic content displayed via the single display mechanism 102 may include any content (e.g. images, etc.) capable of being displayed stereoscopically. In this way, the stereoscopic content may provide an illusion of depth when displayed. Just by way of example, the stereoscopic content may include three-dimensional (3-D) content.

As shown, the stereoscopic content may be received by the single display mechanism 102 as a plurality of frames 106. The frames 106 may be of an image, video, etc. Of course, while frames 106 are described herein, it should be noted that the stereoscopic content may be apportioned in any desired manner.

Additionally, the frames 106 may be provided by logic 104, as also shown. The logic may include an application and/or any other code outputting the content for stereoscopic display thereof. To this end, the logic 106 may be embodied on a computer, as an option.

In one embodiment, the logic 104 may be separate from the single display mechanism 102, as shown. For example, the logic 104 may be embodied on a computer and/or any other device that is remotely located with respect to the single display mechanism 102. As an option, the logic 104 may provide the frames 106 to the single display mechanism 102 via a hardwire connection between a device embodying the logic 104 and the single display mechanism 102, a wireless connection between the device embodying the logic 104 and the single display mechanism 102, a network connection between the device embodying the logic 104 and the single display mechanism 102, etc.

In another embodiment, the logic 104 may be integrated with the single display mechanism 102. Thus, logic 104 of the single display mechanism 102 may provide the frames 106 for stereoscopic display thereof by the single display mechanism 102. Furthermore, the frames 106 may be received by the single display mechanism 102 via a single feed. For example, a single stream may be utilized for communicating the frames 106 to the single display mechanism 102.

Still yet, the frames 106 may include a first subset targeted at one eye (e.g. a right eye) of a viewer and a second subset targeted at another eye (e.g. a left eye) of the viewer. Just by way of example, the frames 106 may include right eye frames (denoted by 'R' in FIG. 1) and left eye frames (denoted by 'L' in FIG. 1). The frames 106 may be provided to the single display mechanism 102 at any desired speed, such as a speed equivalent to a refresh rate of the single display mechanism 102.

In one embodiment, as shown, the frames of the first subset and the frames of the second subset may be alternately provided to the single display mechanism 102. Thus, for example, a first frame targeted at a left eye of the viewer may be provided, after which a first frame targeted at a right eye of the viewer may be provided, after which a second frame targeted at the left eye of the viewer may be provided, after which a second frame targeted at the right eye of the viewer may be provided, and so forth.

In response to receipt of each of the frames 106, the single display mechanism 102 may display such frame. Accordingly, the single display mechanism 102 may display, on a frame by frame basis, frames of the first subset and frames of the second subset in an alternating manner.

As noted above, the single display mechanism 102 may include a polarized filter and a liquid crystal. The display of the content may pass through the polarized filter and the liquid crystal such that the content may be stereoscopically displayed. Optionally, the stereoscopic content may be displayed at a high refresh rate (e.g. 120 images, frames, etc. per second).

In one embodiment, the polarized filter may be utilized by the liquid crystal for polarizing each frame 106 based on the eye to which the frame is targeted. For example, the liquid crystal may have an associated predetermined polarization and may be capable of rotating the polarized filter (e.g. 90 degrees, in an opposite direction, etc.) to provide a rotated predetermined polarization. The rotation may be provided in any desired manner, such as by applying an electric charge (e.g. voltage) to the liquid crystal in order to rotate the polarized filter, etc.

The passive glasses may include two lenses, one for each eye. In one embodiment, the predetermined polarization may be aligned with (e.g. may include the same polarization as) one lens of the passive glasses and the rotated predetermined polarization may be aligned with (e.g. may include the same polarization as) another lens of the passive glasses. In this way, when a frame is displayed utilizing the predetermined polarization, only the lens aligned with such predetermined polarization may allow viewing of the frame, whereas when a frame is displayed utilizing the rotated predetermined polarization, only the lens aligned with such rotated predetermined polarization may allow viewing of the frame. For example, the stereoscopic content may be displayed via the liquid crystal such that only one lens of the passive glasses allows a viewer wearing the passive glasses to view the stereoscopic content when displayed at the predetermined polarization and only the other lens of the passive glasses allows the viewer to view the stereoscopic content when displayed at the rotated predetermined polarization.

In another embodiment, the liquid crystal may be synchronized with the alternating display of the frames of the first subset and the frames of the second subset. Just by way of example, as a frame targeted at one eye of the viewer is displayed, the liquid crystal may be synchronized therewith to polarize the frame to align with the lens of the targeted eye. As another frame targeted at the other eye of the viewer is displayed, the liquid crystal may be synchronized therewith to polarize the frame to align with the lens of the other targeted eye. Accordingly, the liquid crystal may have an associated predetermined polarization and may rotate the predetermined polarization via the polarized filter based on the synchronization.

In one embodiment, the synchronization may be provided by the logic 104. For example, the logic 104 may provide control information to the liquid crystal to synchronize the liquid crystal with the alternating display of the frames of the first subset and the frames of the second subset. Such control information may indicate which eye is the target of the frame. As an option, the control information may be provided with the frames 106 (e.g. via the single feed) to the single display mechanism 102, but of course may also be provided separate from such frames 106.

It should be noted that in another embodiment, a polarized filter may not necessarily be required to polarize the projected image. For example, the frames 106 may be passed through or reflected from another LCD.

Figure 2:
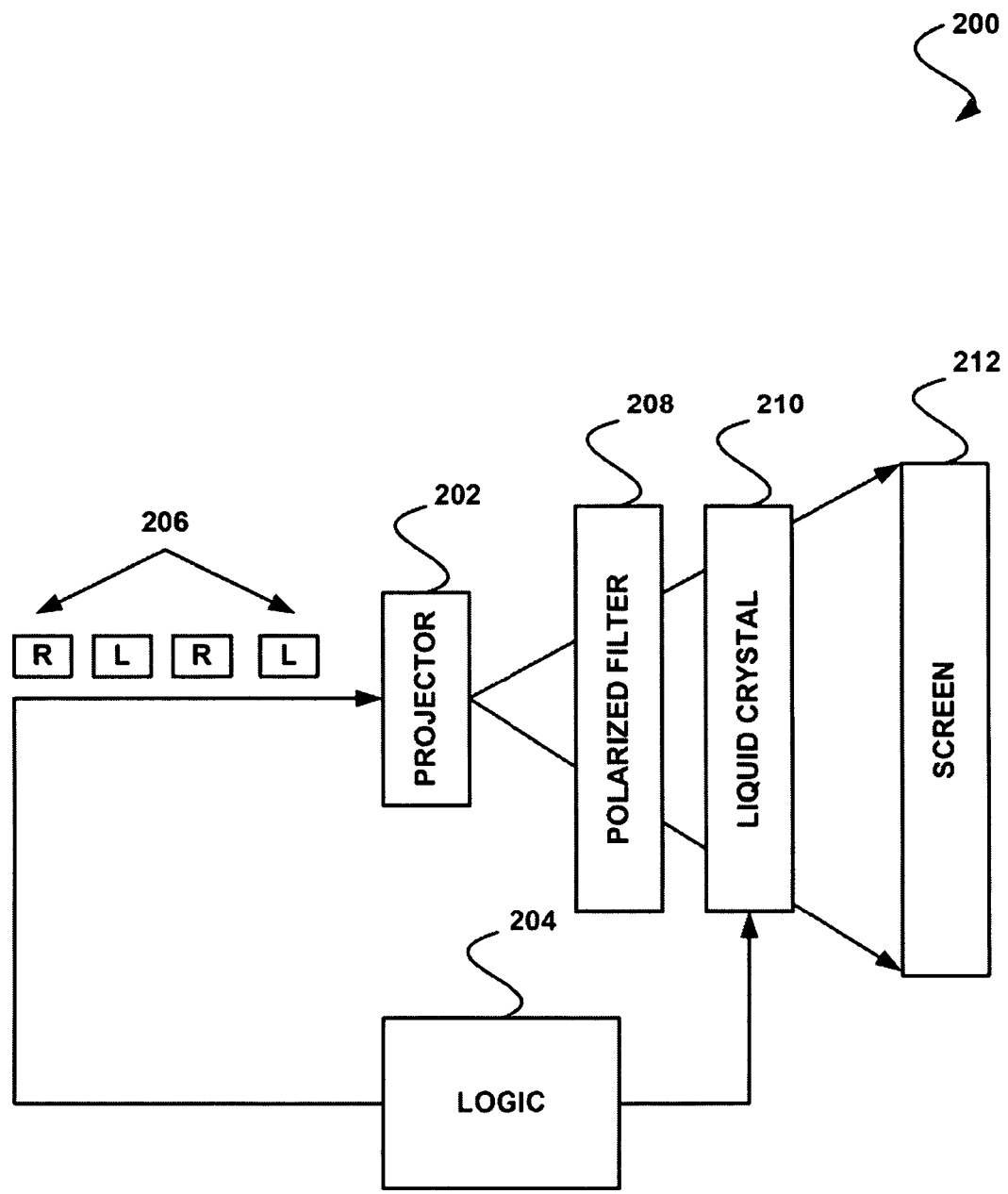
FIG. 2 shows a single display system for displaying stereoscopic content, in accordance with another embodiment.

FIG. 2 shows a single display system 200 for displaying stereoscopic content, in accordance with another embodiment. It should be noted that the aforementioned definitions may apply during the present description.

As shown, a single display mechanism is provided which is capable of displaying stereoscopic content for viewing with passive glasses. With respect to the present embodiment, the single display mechanism may include a projector 202. For example, the projector 202 may project stereoscopic content onto a screen 212 for viewing by a viewer wearing passive glasses.

As shown, the stereoscopic content may be received by the projector 202 as a plurality of frames 206. The frames 206 may be of an image, video, etc. Of course, while frames 106 are described herein, it should be noted that the stereoscopic content may be apportioned in any desired manner.

Additionally, the frames 206 may be provided by logic 204, as also shown. The logic may include an application and/or any other code outputting the content for stereoscopic display thereof. To this end, the logic 206 may be embodied on a computer, as an option.

In one embodiment, the logic 204 may be separate from the projector 202, as shown. For example, the logic 204 may be embodied on a computer and/or any other device that is remotely located with respect to the projector 202. As an option, the logic 204 may provide the frames 206 to the projector 202 via a hardwire connection between a device embodying the logic 204 and the projector 202, a wireless connection between the device embodying the logic 204 and the projector 202, a network connection between the device embodying the logic 204 and the projector 202, etc.

In another embodiment, the logic 204 may be integrated with the projector 202. Thus, logic 204 of the projector 202 may provide the frames 206 for stereoscopic display thereof by the projector 202. Furthermore, the frames 206 may be received by the projector 202 via a single feed. For example, a single stream may be utilized for communicating the frames 206 to the projector 202.

Still yet, the frames 206 may include a first subset targeted at one eye (e.g. a right eye) of a viewer and a second subset targeted at another eye (e.g. a left eye) of the viewer. Just by way of example, the frames 206 may include right eye frames (denoted by 'R' in FIG. 2) and left eye frames (denoted by 'L' in FIG. 2). The frames 206 may be provided to the projector 202 at any desired speed, such as a speed equivalent to a refresh rate of the projector 202.

In one embodiment, as shown, the frames of the first subset and the frames of the second subset may be alternately provided to the projector 202. Thus, for example, a first frame targeted at a left eye of the viewer may be provided, after which a first frame targeted at a right eye of the viewer may be provided, after which a second frame targeted at the left eye of the viewer may be provided, after which a second frame targeted at the right eye of the viewer may be provided, and so forth.

In response to receipt of each of the frames 206, the projector 202 may display such frame. Accordingly, the projector 202 may display, on a frame by frame basis, frames of the first subset and frames of the second subset in an alternating manner.

The projector 202 may display each received frame through a polarized filter 208 and a liquid crystal 210. For example, the display of the content may pass through the polarized filter 208 and the liquid crystal 210 such that the content may be stereoscopically displayed. Optionally, the stereoscopic content may be displayed at a high refresh rate (e.g. 120 images, frames, etc. per second).

While the polarized filter 208 and the liquid crystal 210 are shown separate from one another and from the projector 202, it should be noted that any of the polarized filter 208, the liquid crystal 210, and/or the projector 202 may be integrated. For example, the projector 202 may be integrated with the polarized filter 208, the projector 202 may be integrated with the liquid crystal 210, etc.

In one embodiment, the polarized filter 208 may be utilized by the liquid crystal 210 for polarizing each frame 206 based on the eye to which the frame is targeted. For example, the liquid crystal 210 may have an associated predetermined polarization and may be capable of rotating the polarized filter 208 (e.g. 90 degrees, in an opposite direction, etc.) to provide a rotated predetermined polarization. The rotation may be provided in any desired manner, such as by applying an electric charge (e.g. voltage) to the liquid crystal 210 in order to rotate the polarized filter 208, etc.

In another optional embodiment, each frame 206 may be polarized based on the eye to which the frame is targeted utilizing a mechanical filter (not shown), instead of being polarized by the polarized filter 208 and the liquid crystal 210. For example, a filter may mechanically switch between two polarizations by swapping a first filter associated with a first polarization (e.g. directed to a first eye) and a second filter associated with a second polarization (e.g. directed to a second eye).

The passive glasses may include two lenses, one for each eye. In one embodiment, the predetermined polarization may be aligned with (e.g. may include the same polarization as) one lens of the passive glasses and the rotated predetermined polarization may be aligned with (e.g. may include the same polarization as) another lens of the passive glasses. In this way, when a frame is displayed utilizing the predetermined polarization, only the lens aligned with such predetermined polarization may allow viewing of the frame, whereas when a frame is displayed utilizing the rotated predetermined polarization, only the lens aligned with such rotated predetermined polarization may allow viewing of the frame. For example, the stereoscopic content may be displayed via the liquid crystal 210 such that only one lens of the passive glasses allows a viewer wearing the passive glasses to view the stereoscopic content when displayed at the predetermined polarization and only the other lens of the passive glasses allows the viewer to view the stereoscopic content when displayed at the rotated predetermined polarization.

In another embodiment, the liquid crystal 210 may be synchronized with the alternating display of the frames of the first subset and the frames of the second subset. Just by way of example, as a frame targeted at one eye of the viewer is displayed, the liquid crystal 210 may be synchronized therewith to polarize the frame to align with the lens of the targeted eye. As another frame targeted at the other eye of the viewer is displayed, the liquid crystal 210 may be synchronized therewith to polarize the frame to align with the lens of the other targeted eye. Accordingly, the liquid crystal 210 may have an associated predetermined polarization and may rotate the predetermined polarization via the polarized filter 208 based on the synchronization.

In one embodiment, the synchronization may be provided by the logic 204. For example, the logic 204 may provide control information to the liquid crystal 210 to synchronize the liquid crystal 210 with the alternating display of the frames of the first subset and the frames of the second subset. Such control information may indicate which eye is the target of the frame. As an option, the control information may be provided with the frames 206 (e.g. via the single feed) to the projector 202, but of course may also be provided separate from such frames 206 (as shown). For example, if the liquid crystal 210 is integrated with the projector 202, the control information may be provided to the liquid crystal 210 with the frames 206. If, however, the liquid crystal 210 is separate from the projector 202 (as shown), the control information may be provided to the liquid crystal 210 separately from the frames 206.

It should be noted that in another embodiment, the polarized filter 208 may not necessarily be required to polarize the projected image. For example, the frames 206 may be passed through or reflected from another LCD.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
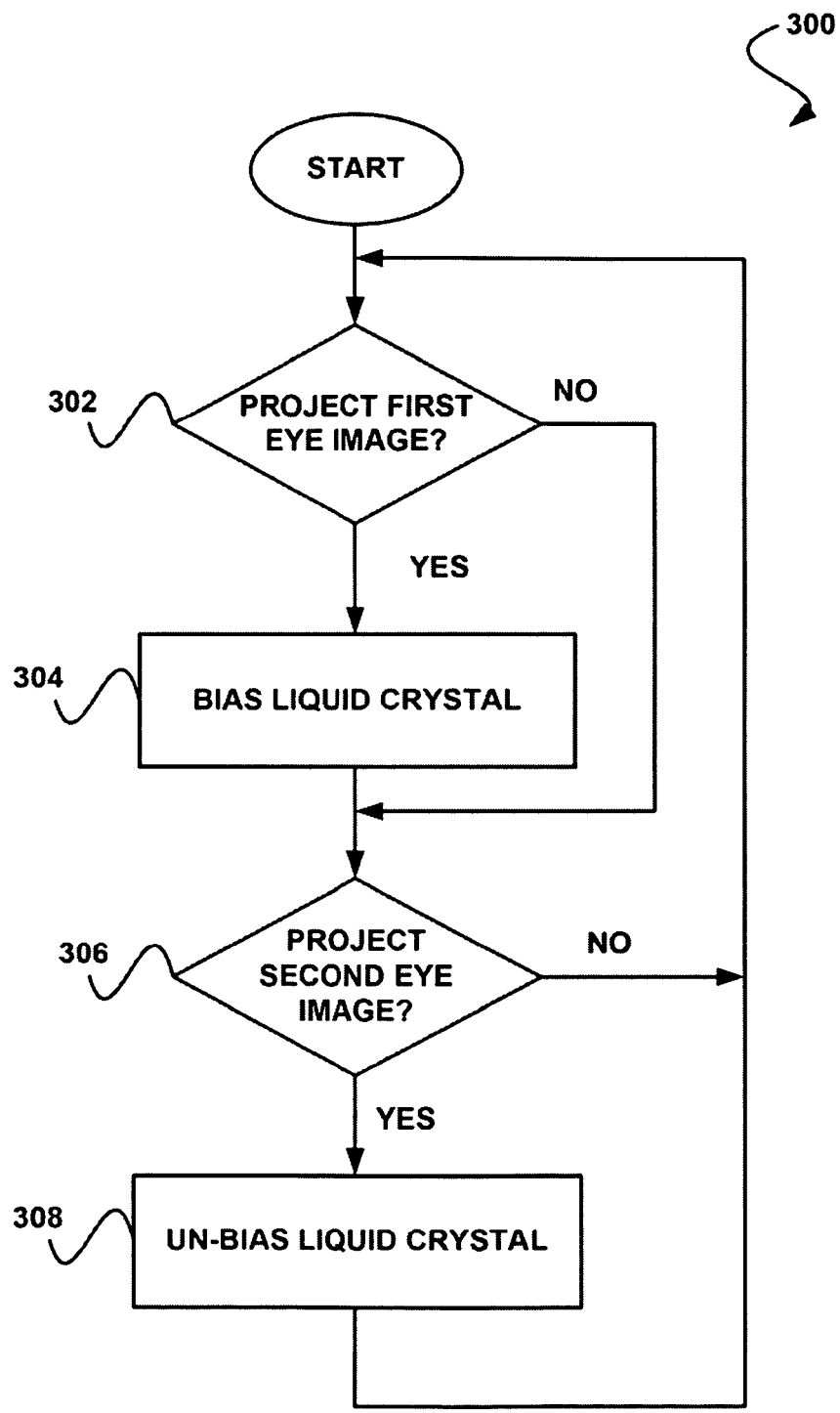
FIG. 3 shows a method for biasing a liquid crystal, in accordance with yet another embodiment.

FIG. 3 shows a method 300 for biasing a liquid crystal, in accordance with yet another embodiment. As an option, the method 300 may be carried out in the context of the environment of FIGS. 1 and/or 2. Just by way of example, the method 300 may be carried out utilizing the logic 104 and/or 204 of FIGS. 1 and/or 2, respectively. Of course, however, the method 300 may be carried out any desired environment. Again, it should be noted that the aforementioned definitions may apply during the present description.

As shown in decision 302, it is determined whether a first eye image is projected. With respect to the present embodiment, the first eye image may include an image targeted at a first eye (e.g. left eye, right eye, etc.) of a viewer wearing passive glasses. In one embodiment, the first eye image may include a single frame of an image targeted at the first eye of the viewer.

In another embodiment, the first eye image may be projected upon receipt thereof by a single display mechanism. Accordingly, it may be determined that the first eye image is projected when the first eye image is received by the single display mechanism (e.g. from logic providing such first eye image).

If it is determined in decision 302 that the first eye image is projected, a liquid crystal is biased. Note operation 304. With respect to the present embodiment, biasing the liquid crystal may include rotating the liquid crystal a predetermined rotation (e.g. 90 degrees, etc.). The rotation may be provided via an electric charge, for example. Additionally, the liquid crystal may be integral with a polarization filter, such that biasing the liquid crystal may result in a polarization of the first eye image that is associated with the rotation.

The liquid crystal may be biased an amount that aligns the polarization of the first eye image with a polarization of a lens worn over the first eye of the viewer. In this way, biasing the liquid crystal may result in the viewer being capable of viewing the first eye image via the lens worn on the viewer's first eye. It may further result in the viewer's other eye, over which a differently polarized lens may be worn, being incapable of viewing the first eye image (e.g. viewing the image as all black, etc.).

If it is determined in decision 302 that the first eye image is projected, or after the biasing of the liquid crystal in operation 304, it is determined whether a second eye image is projected. Note decision 306. With respect to the present embodiment, the second eye image may include an image targeted at a second eye (e.g. left eye, right eye, etc.) of a viewer wearing passive glasses. The second eye may include the eye of the viewer that is other than the first eye. In one embodiment, the second eye image may include a single frame of an image targeted at the second eye of the viewer.

In another embodiment, the second eye image may be projected upon receipt thereof by a single display mechanism. Accordingly, it may be determined that the second eye image is projected when the second eye image is received by the single display mechanism (e.g. from logic providing such second eye image).

If it is determined in decision 306 that the second eye image is projected, the liquid crystal is un-biased. Note operation 308. With respect to the present embodiment, un-biasing the liquid crystal may include maintaining the liquid crystal at a predetermined polarization (e.g. zero degrees, etc.). Since the liquid crystal may be integral with a polarization filter, as noted above, un-biasing the liquid crystal may result in a polarization of the first eye image that is a default polarization of the polarization filter.

The default polarization may be aligned with the polarization of a lens worn over the second eye of the viewer, such that the polarization of the second eye image may be aligned with the polarization of such lens worn over the second eye of the viewer. In this way, un-biasing the liquid crystal may result in the viewer being capable of viewing the second eye image via the lens worn on the viewer's second eye. It may further result in the viewer's other eye (e.g. first eye), over which a differently polarized lens may be worn, being incapable of viewing the second eye image (e.g. viewing the image as all black, etc.).

Furthermore, it is again determined whether a first eye image is projected (decision 302). To this end, the liquid crystal may be alternately biased and un-biased based on an eye targeted by the image being projected. For example, the biasing may polarize the image to align with a polarization of a lens worn over the targeted eye of the viewer, such that the targeted eye of the viewer may view the image.

Figure 4:
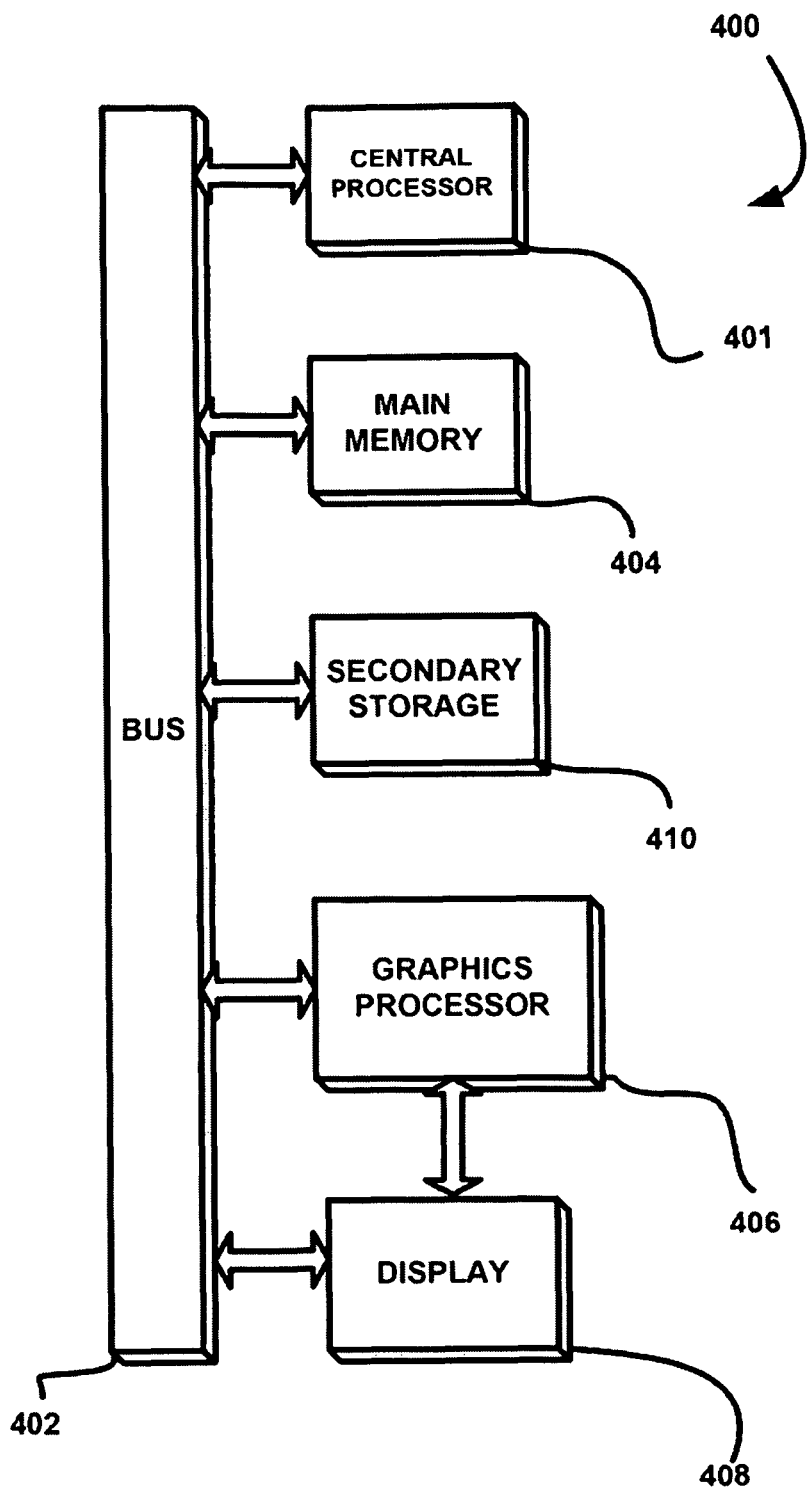
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices m including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
    logic providing content for display, the content including a first subset of frames targeted to a first eye of a user and a second subset of frames targeted to a second eye of the user;
    a polarized filter;
    a liquid crystal; and
    a projector receiving the content from the logic and projecting both the first subset of frames and the second subset of frames of the content through the polarized filter and the liquid crystal for stereoscopic viewing of the content by the user with passive glasses;
    wherein the polarized filter and liquid crystal are controlled such that the polarized filter and the liquid crystal are in a first orientation when a frame of the first subset of frames of the content is projected through the polarized filter and the liquid crystal, and the polarized filter and the liquid crystal are in a second orientation when a frame of the second subset of frames of the content is projected through the polarized filter and the liquid crystal;
    wherein the system is operable such that controlling of the polarized filter and the liquid crystal is such that the polarized filter is in a first position when the frame of the first subset of frames of the content is projected through the polarized filter and the liquid crystal, and the polarized filter is in a second position at 90 degrees to the first position when the frame of the second subset of frames of the content is projected through the polarized filter and the liquid crystal.

2. The system of claim 1, wherein the projector is integrated with the polarized filter.

3. The system of claim 1, wherein the projector is integrated with the liquid crystal.

4. The system of claim 1, wherein the projector is separate from the polarized filter.

5. The system of claim 1, wherein the projector is separate from the liquid crystal.

6. The system of claim 1, wherein the content including the first subset of frames targeted to the first eye of the user and the second subset of frames targeted to the second eye of the user is received by the projector via a single feed.

7. The system of claim 1, wherein frames of the first subset and frames of the second subset are alternately provided to the projector.

8. The system of claim 1, wherein the projector alternately displays frames of the first subset and frames of the second subset.

9. The system of claim 8, wherein the liquid crystal is synchronized with the alternating display of the frames of the first subset and the frames of the second subset.

10. The system of claim 9, wherein the liquid crystal has an associated predetermined polarization and rotates the predetermined polarization based on the synchronization.

11. The system of claim 10, wherein the predetermined polarization is aligned with one lens of the passive glasses and the rotated predetermined polarization is aligned with another lens of the passive glasses.

12. The system of claim 11, wherein the stereoscopic content is displayed via the liquid crystal such that only the one lens of the passive glasses allows the user wearing the passive glasses to view the stereoscopic content when displayed at the predetermined polarization and only the other lens of the passive glasses allows the user to view the stereoscopic content when displayed at the rotated predetermined polarization.

13. The system of claim 1, wherein the liquid crystal is prevented from polarizing the plurality of frames by receiving the plurality of frames after the plurality of frames have been polarized.

14. The system of claim 1, wherein the polarized filter is controlled by applying an electric charge to the liquid crystal.

15. The system of claim 14, wherein applying the electric charge to the liquid crystal causes the polarized filter to rotate to the first position, and removing the application of the electric charge to the liquid crystal causes the polarized filter to rotate to the second position.

16. A method, comprising:
receiving content for display utilizing a projector, the content including a first subset of frames targeted to a first eye of a user and a second subset of frames targeted to a second eye of the user;
projecting both the first subset of frames and the second subset of frames of the content through a polarized filter and a liquid crystal for stereoscopic-viewing by the user with passive glasses; and
controlling the polarized filter and the liquid crystal such that the polarized filter and the liquid crystal are in a first orientation when a frame of the first subset of frames of the content is projected through the polarized filter and the liquid crystal, and the polarized filter and the liquid crystal are in a second orientation when a frame of the second subset of frames of the content is projected through the polarized filter and the liquid crystal;
wherein controlling of the polarized filter and the liquid crystal is such that the polarized filter is in a first position when the frame of the first subset of frames of the content is projected through the polarized filter and the liquid crystal, and the polarized filter is in a second position at 90 degrees to the first position when the frame of the second subset of frames of the content is projected through the polarized filter and the liquid crystal.

* * * * *